US006496686B1

United States Patent
Charkani (El Hassani) et al.

(10) Patent No.: US 6,496,686 B1
(45) Date of Patent: Dec. 17, 2002

(54) MITIGATION OF INTERFERENCE ASSOCIATED TO THE FREQUENCY OF THE BURST IN A BURST TRANSMITTER

(75) Inventors: Ahmed N. Charkani (El Hassani), Le Mans (FR); Gilles P. Miet, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/359,876

(22) Filed: Jul. 27, 1999

(30) Foreign Application Priority Data

Jul. 28, 1998 (EP) .............................. 98401930
Aug. 25, 1998 (FR) .............................. 9810694

(51) Int. Cl.$^7$ .............................. H04J 1/100
(52) U.S. Cl. .................. 455/114; 375/135; 375/285
(58) Field of Search .................. 455/501, 63, 67.3, 455/114, 126; 375/284, 285, 135

(56) References Cited

U.S. PATENT DOCUMENTS

| | | | |
|---|---|---|---|
| 4,932,061 A | 6/1990 | Kroon et al. ............... 381/30 |
| 5,740,165 A | * 4/1998 | Vannucci ................ 370/330 |
| 6,035,000 A | * 3/2000 | Bingham ................ 370/525 |
| 6,269,093 B1 | * 7/2001 | Alapuranen et al. ........ 370/343 |
| 6,282,247 B1 | * 8/2001 | Shen ..................... 375/285 |

* cited by examiner

Primary Examiner—William Cumming
Assistant Examiner—Nick Corsaro
(74) Attorney, Agent, or Firm—Dicran Halajian

(57) ABSTRACT

A communication terminal includes a transmitter for transmitting bursts of a modulated carrier. An interference suppressor suppresses an known interference signal caused by the transmission of the bursts and includes a frequency separator which separates an input signal into sub-band signals. The interference suppressor further includes an amplitude adjustor which adjusts the amplitude of the sub-band signals having spectral components of the interference signal, and a combiner which combines the sub-band signals to form a combined output signal. The amplitude adjustor includes a multiplier which multiplies the amplitude of the sub-band signals with a value which decreases with increasing strength of the spectral components of the interference signal.

8 Claims, 2 Drawing Sheets

MITIGATION OF INTERFERENCE ASSOCIATED TO THE FREQUENCY OF THE BURST IN A BURST TRANSMITTER

FIELD OF THE INVENTION

The present invention is related to a communication terminal comprising a transmitter for transmitting bursts of a modulated carrier, the terminal comprises an audio signal processing arrangement.

BACKGROUND OF THE INVENTION

Such communication terminal is known from U.S. Pat. No. 4,932,061.

In mobile radio systems often use is made of time domain multiple access (TDMA) in order to enable different communication to access the same radio channel. In TDMA the radio channel is subdivided into a number of subsequent time slots. Each of the timeslots can be assigned to a communication terminal for communication with the base station. For doing so, the communication terminal comprises a transmitter for transmitting burst of data modulated on a carrier in the time slot assigned to it. In general the assigned time slot has a fixed position in a transmission frame, resulting in a periodic transmission of the information burst.

Due to the periodic nature of the burst and the fast changing signal at the beginning and the end of the burst it can easily happen that the RF bursts emitted by the communication terminal causes interference in the audio part of the communication terminal. This can cause transmission of a periodic noise like signal to the base station, and to the presence of a similar noise like signal in the audio signal received from the base station.

Although it it possible to reduce the amount of interference by proper printed circuit board lay out, it is experienced that reduction of the interference to an inaudible level leads to a drastic increase of the costs involved with manufacturing the communication terminal. Furthermore it leads to a more bulky design of the communication terminal, which is of course highly undesirable.

SUMMARY OF THE INVENTION

The object of the present invention is to provide a communication terminal according to the preamble, in which the manufacturing costs involved with the suppression of the interference signal due to the emission of the bursts is substantially reduced.

To achieve said object, the communication terminal according to the invention is characterized in that that the audio signal processing arrangement comprises interference suppressing means for suppression a known interference signal being caused by the transmission of the bursts of the modulated signal.

By using interference suppressing means in the audio processing means, it becomes possible to reduce the interference signal to an inaudible amount without needing expensive measures. Because the basic properties of the interference signals, such as the spectral composition of the interfering signal, are known in advance, the complexity of the interference suppressing means can be substantially reduced.

An embodiment of the present invention is characterized in that the interfering suppression means comprise frequency separating means for separating its input signal into a plurality of sub-band signals, amplitude adjusting means for adjusting at least the amplitude of, the sub-band signals comprising spectral components of the interference signal, and combining means for combining the sub-band signals into a combined output signal.

An easy and effective way of suppressing the interference signal is the use of noise suppressing techniques, in which the input signal is split into a number of sub-bands. The amplitude of the signal in the sub-bands containing interference signals are reduced. Subsequently, the sub-band signals are combined again into a signal in which the interference signal is strongly reduced.

A further embodiment of the present invention is characterized in that the amplitude adjusting means are arranged for multiplying the amplitude of the sub-band signals comprising spectral components of the known interference signal with a value which decreases with increasing strength of the component of the known interference signal.

By reducing the amplitude of the sub-band signals in dependence on the strength of the interference, it is obtained that the changes made to the audio signal are not larger than is needed to suppress the interference signal.

BRIEF DESCRIPTION OF THE DRAWINGS

The present invention will now be explained with reference to the drawings.

DETAILED DESCRIPTION OF THE INVENTION

Figure 1:
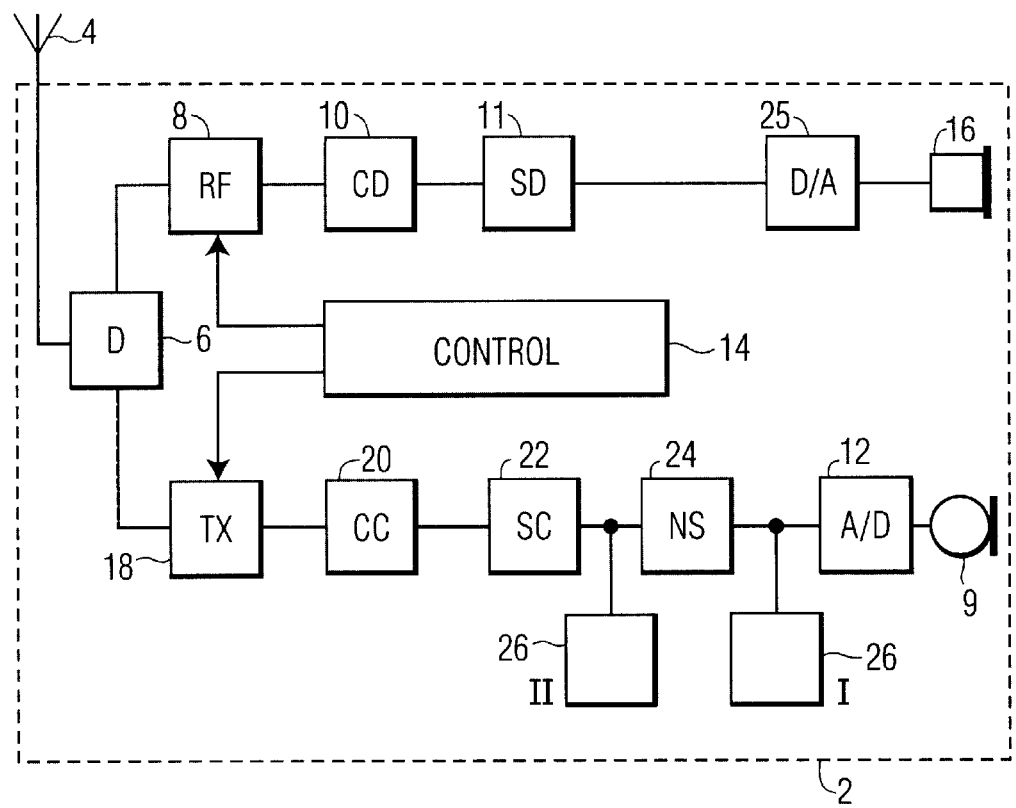
FIG. 1 shows a communication terminal according to the present invention.

The communication device 2 according to FIG. 1 can e.g. be a mobile telephone operating according to the GSM standard or any other mobile radio standard in which known interference signals are generated in the audio part by transmission of RF signals.

An antenna 4 is connected to an input/output of a duplexer 6. The duplexer 6 is arranged for receiving a signal from the antenna 4 and passing it to the RF front end 8, and for passing a signal to be transmitted from a transmitter module 18 to the antenna 4.

The received signal available at the output of the duplexer 6 is downconverted and demodulated by the RF front end 8. The base band signal at the output of the front end 8 is passed to the input of a channel decoder 10 which derives a stream of decoded digital symbols from its input signal. The decoded digital symbols at the output of the channel encoder 10 are passed to a source decoder 11 which is in the case of a mobile telephone a speech decoder. The output signal of the source decoder 11 is converted into an analog signal by using an analog to digital converter 25 and is applied to an earpiece 16 for making the output signal of the source decoder 12 audible.

A microphone 9 generates an audio signal in response to a speech signal from a speaker. The output signal of the microphone 9 is amplified and subsequently converted into a digital signal by means of an analog to digital converter 12. Because the analog output signal of the microphone is quite weak, it is vulnerable to interfering signals such as caused by the burst wise transmission of RF signals by the terminal 2.

The output of the microphone 9 is coupled (via the amplifier and the analog to digital converter) to the interference suppressing means 24. The operation of the interference suppressing means is explained later in more detail. The output of the interference suppressing means 24 is connected to an input of a source encoder 22, which is in the case of a mobile telephone a speech encoder. The source encoder 22 converts its digital input signal into an output signal having a smaller bit rate than its input signal. Also the presence of a speech detector 26 is noted which is placed at position I or II. This circuit produces a signal to indicate that speech is present if the coded level is high and speech is absent if this level is too low.

The output of the source encoder 22 is connected to an input of a channel encoder 20 which encodes its input signal according to an error correcting code such as a convolutional code. The output signal of the channel encoder 20 is applied to a transmitter unit 18. The transmitter unit 18 is arranged for modulating its input signal on a carrier and amplifying the modulated signal. The transmitter 18 is arranged for transmitting in a burst like fashion. In the GSM standard, burst with a length of 15/26 ms are transmitted with a period of 60/13 ms. Because the repetition period of the burst signal corresponds to a frequency of 217 Hz, which is in the audible frequency range, this signal can cause an audible interference signal in the output signal of the microphone 9.

The output of the transmitter 18 is connected to the input of the duplexer 18 which applies the amplified RF signal to the antenna 4.

The terminal 2 also comprises a controller 14 for controlling the RF front end 8, e.g. for setting the actual frequency to which the receiver should be tuned. The controller 14 is also connected to the transmitter unit 18 for setting the frequency and for switching the transmitter on and off according to the burst period.

Figure 2:
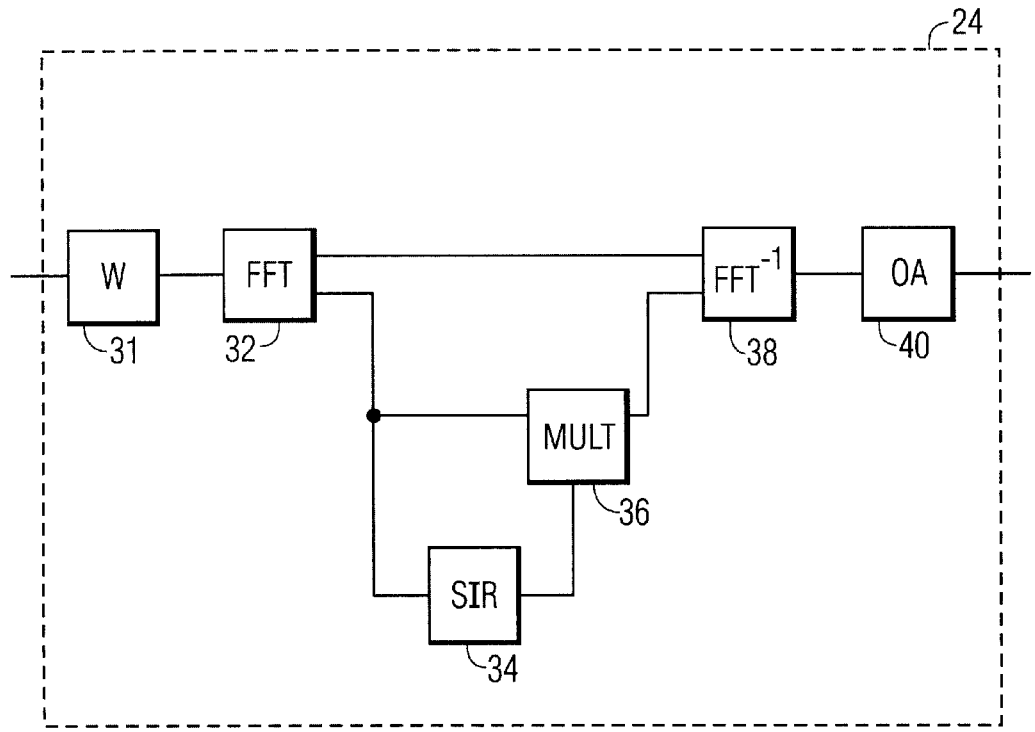
FIG. 2 shows a detailed embodiment of the interference suppression means 24 to be used in the communication terminal according to the invention.

In the interference suppressing means 24 according to FIG. 2, the input signal is applied to a window processor 31. The windows processor 31 constructs frames of 160 samples of the input signal and applies a window function to said 160 samples. Suitable window functions are e.g. a Hamming or a Hanning window. Consecutive frames have an overlap of 80 samples.

The output signal of the window processor 31 is applied to a frequency separating means which is here a FFT unit 32 which calculates Fast Fourier Transform of the frame of 160 input samples. Because the frame comprises 160 samples, a 256 points FFT is required for performing the FFT operation. The output signals of the FFT unit 32 is made available as amplitude and phase components at different outputs. This is done for all 256 frequency components.

A signal to interference ratio calculator 34 calculates the signal to interference ratio for the relevant frequency bands. Because the nature of the interfering signal is known, the calculation of the signal to interference ratio needs only to be performed for a predetermined number of sub-bands. Each of the sub-bands at the output of the FFT unit 32 is indicated with a frequency index k which can have a value between 1 and 256 for a 256 point FFT. For the frequency indices $k_n$ which are involved with the determination of the signal to interference ratio can be written:

$$k_n = ROUND\left(256 * \frac{n \cdot F_B}{F_S}\right); \quad 1 \leq n \leq n_{MAX} \quad (1)$$

In equation (1) $F_B$ is the fundamental frequency of the interfering signal. In the GSM standard this frequency is equal to 13/60 kHz. $F_S$ is the sampling rate of the audio signal which is normally equal to 8 kHz. The ROUND function performs the well known rounding operation. n is an integer index which runs from 1 to a maximum value new. Experiments have shown that the amplitude of the interfering signals due to the transmission of the bursts is very low for frequencies above 2 kHz. Consequently no additional suppression is needed above 2 kHz. This results in a value of $n_{MAX}$ of ROUND(2000/$F_B$)=9.

By performing the determination of the signal to interference ratio only for 9 frequency indices instead of for all 256 frequency indices, the complexity of the interference suppressing means is substantially reduced.

The signal to interference ratio is determined by measuring the amplitude $X_w(k,t)$ of the sub-bands involved when an input speech signal is present and by measuring the amplitude $N_W(k,t)$ of the sub-band signals when no input speech signal is present. The signal to interference ratio is determined by calculating the ratio between $N_W(k,t)$ and $X_W(k,t)$. This ratio is only calculated for the $n_{MAX}$ sub-bands mentioned above. Subsequently, the means 34 calculate a multiplication factor $G_{k_n}$ for the $n_{MAX}$ sub-bands according to:

$$G_{k_n} = \max\left(1 - \alpha \frac{|N_w(k,t)|}{|N_w(k,t)|}, G_{MIN}\right) \quad (2)$$

In equation (2), a is a constant and $G_{MIN}$ is a minimum value of $G_k$.

A multiplier 36 determines an output amplitude for all sub-bands. For the k sub-bands the output amplitude is determined according to $$S_w(k,t) = \begin{cases} |X_w(k,t)|; & k \neq k_n \\ G_{k_n}|X_w(k,t)|; & k = k_n \end{cases} \quad (3)$$

From equation (3) it is clear that only a multiplication takes place for the nab values of k corresponding to a value $k_n$. The amplitude value of the other sub-bands is passed unaltered to the output of the multiplier 36.

The amplitude information for the sub-bands at the output of the multiplier 36 and the phase information provided by the FFT-unit 32 are combined by an inverse FFT unit 38 and transformed into the time domain. The output of the inverse FFT unit 38 is connected to the input of a processor 40 which performs an overlap add operation to obtain the audio signal substantially free from the interfering components. The processor 40 takes the first half of the current block of output samples, and adds this to the stored second half of the previous block. The second half of the current block is stored for being combined with the first half of the next block.

It is observed that a simplification can be introduced, because the input signal is a real signal. Consequently the amplitude spectrum has even symmetry around 0, and the phase spectrum has odd symmetry around 0. Consequently only the FFT coefficients for positive frequencies have to be calculated. This means that for the 256 points FFT only the first 128 points have to be calculated. The same is valid for the operations to be performed in the multiplier 36.

Alternatively, the interference suppression means 24 can also be implemented as a band reject filter which attenuates in the spectrum of the speech signal both the fundamental and its harmonics, while this disturbance appears in a periodic fashion. The transfer function H(z) of a filter that satisfies this requirement is written as:

$$H(z) = \delta \frac{1 - b1 \cdot z^{-37}}{1 - a1 \cdot z^{-37}} \quad (4)$$

The parameters δ, b1, a1 are chosen to better satisfy the following requirements C1, C2, C3:

(C1):

$$\left| H\left(e^{j2\pi \frac{nF0}{Fs}}\right) \right| = \Delta \quad (5)$$

(C2):

$$\left| H\left(e^{j2\pi \frac{f}{Fs}}\right) \right| = [1 - \alpha, 1] \text{ for } f \notin [nF0 - \varepsilon, nF0 + \varepsilon] \quad (6)$$

ε and α also being smallest possible.

[1−α,1]for f∉[nF0−∈,nF0

+∈]∈ and α also being smallest possible. (6)

(C3):

$$\left| H\left(e^{j2\pi \frac{(n+1)F0}{2Fs}}\right) \right| = 1 \text{ for } n = 0, 1, 2, 3, \ldots \quad (7)$$

In these relationships:
Fs: is the sampling frequency (Fs=8 kHz
F0: is the fundamental frequency of the disturbance, that is 16/30 kHz (216.77 Hz),
Δ: is the attenuation factor applied to the signals that occur with said disturbing frequency.
The last requirement (C3) implies:

$$\delta = \sqrt{\frac{[1 - a1 \cdot \cos(2\pi \cdot 37 \cdot F0/Fs)]^2 + [a1 \cdot \sin(2\pi 37 F0/Fs)]^2}{[1 - b1 \cdot \cos(2\pi \cdot 37 \cdot F0/Fs)]^2 + [b1 \cdot \sin(2\pi 37 F0/Fs)]^2}} \quad (8)$$

Figure 3:
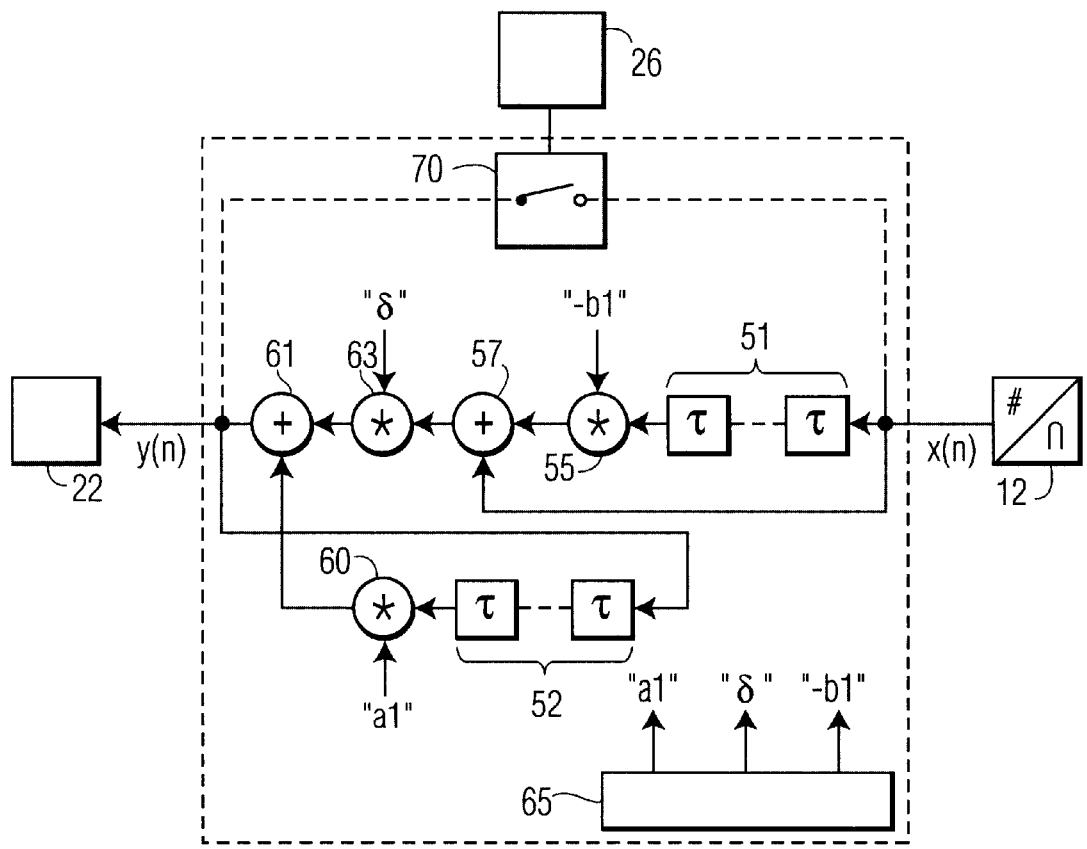
FIG. 3 shows the structure of a filter used as interference suppression means 24.

The structure of such a filter 22 is represented in FIG. 3. It is formed by two delay systems 51 and 52 each causing a delay of 37σ which corresponds to the period of appearance of the disturbing signal (≈4.6 ms). The input of the delay system 51 receives the signal x(n) which is the digital signal produced by the coder 12. The output signal of this delay system is multiplied by the factor <<−b1>> by means of a multiplier circuit 55. The signal x(n) is added by and adder circuit 57 to the signal that has just been multiplied. The input of the delay system 52 receives the signal y(n) which is the output signal of the filter 30. The output signal of the delay system 52 is multiplied by the coefficient <<a1>> by a multiplier circuit 60 and is then applied to one of the two inputs of an adder circuit 61 whose output forms the signal y(n). The other input of the circuit 61 is connected to the output of a multiplier circuit 63 which performs the multiplication by the coefficient δ of the output signal of the adder circuit 57. A coefficient management circuit 65 produces the various values of these coefficients a1, −b1 and δ. These values may be fixed or may vary as a function of the signal x(n).

One of the preferred choices is:

$$\begin{cases} a1 = 0 \\ b1 = \frac{E[x(n) \cdot x(n - 37)]}{E[x^2(n)]} \\ \delta = \frac{1}{\sqrt{[1 - b1 \cdot \cos(2\pi \cdot 37 \cdot F0/Fs)]^2 + [b1 \cdot \sin(2\pi 37 F0/Fs)]^2}} \end{cases} \quad (9)$$

It is to be noted that the speech detector 26 may be placed at the output of this filter 30 in position II (see FIG. 1).

As a variant, the filter 30 has a short circuit formed by a switch circuit 70. If there is no conversation, which is detected by the detector 26, the transmission no longer takes place in said period and it is not necessary to filter, which does not provide anything in this case and thus it is important to stop its action.

Figure 4:
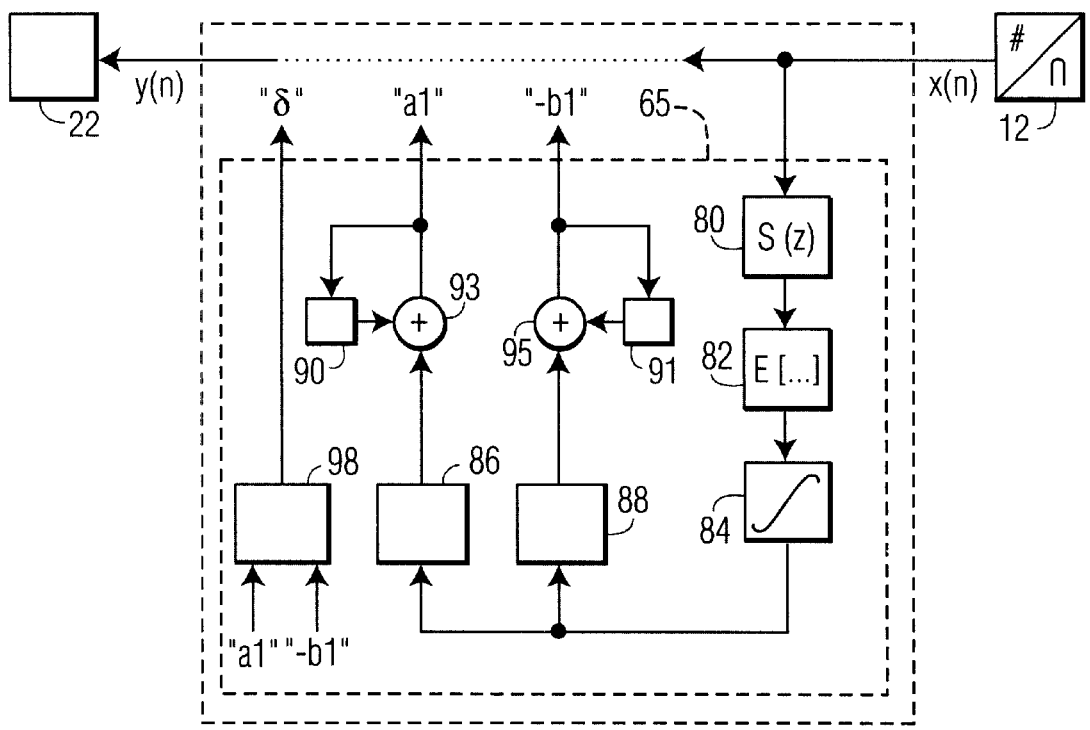
FIG. 4 shows the structure of the adjusting circuits for varying the weight factors of the filter of FIG. 2.

FIG. 4 shows another example of embodiment of the invention. Like elements to those of the preceding Figures have like references. This Figure shows an embodiment of a adjusting circuit 65.

This circuit comprises a filter 80 whose transfer function in Z-transform is S(z). This function is written as:

$$S(z) = \frac{1 - 0,85 z^{-37}}{1 - 0,90 z^{-37}} \quad (10)$$

This filter derives from the output signal of the coder 12 the contribution of parasitic effects generated by the transmitter 18. The filtered signal is processed in the calculation circuit 82 to give a normalized already formulated value.

$$f_{corr} = \frac{E[x(n) \cdot x(n - 37)]}{E[x^2(n)]} \quad (11)$$

This function $f_{corr}$ is then integrated by an integrator circuit 84. The function $f_{coor}$ thus obtained is then used for defining two functions $f_a$ and $f_b$ by means of two function circuits 86 and 88. These two functions will make corrections in the coefficients <<a1>> and <<−b1>>. The previous values <<a1.0>> and <<b1.0>> of these coefficients <<a1>> and <<−b1>> are stored in memory elements 90 and 91 in timing with the frequency Fs and the f following relationships are established by means of two adder circuits 93 and 95

$$\begin{cases} a1 = a1, 0 + f_a \\ b1 = b1, 0 + f_b \end{cases} \quad (12)$$

The value of δ given by the above formula (9) by means of a calculation circuit 98.

The variations of these coefficients may be obtained depending on initial fixed values and the functions $f_a$ and $f_b$ may evolve depending on circumstances.

The functions $f_a$ and $f_b$ are chosen such that 0<a1<b1 with a1>0.8 and b1>0.8.

Thus the latter embodiments provides the advantage that much attenuation of the parasitic signals is obtained when the call signal to the parasitic signal is low and less attention when this ratio is higher.

What is claimed is:

1. Communication terminal comprising:

a transmitter for transmitting bursts of a modulated carrier; and an audio signal processing arrangement; said audio signal processing arrangement including interference suppressing means for suppression an interference signal being caused by the transmission of the bursts;

said interfering suppression means comprising:

frequency separating means for separating its input signal into a plurality of sub-band signals;

amplitude adjusting means for adjusting at least an amplitude of the sub-band signals comprising spectral components of the interference signal; and combining means for combining the sub-band signals into a combined output signal;

wherein the amplitude adjusting means are arranged for multiplying the amplitude of the sub-band signals comprising spectral components of the interference signal with a value which decreases with increasing strength of the spectral components of the interference signal.

2. Communication terminal according claim 1, wherein the interference suppression means comprise a band reject filter for signals having said periodicity.

3. Communication terminal according to claim 2 for which the band reject filter comprises weighting circuits for weighting delayed signals with weight factors, characterized in that adjusting circuits are provided for adjusting said weight factors.

4. Communication terminal according to claim 3, characterized in that the adjusting circuits comprise a filter centered on the certain period and in that the weight factors are derived from the signals produced by said centered filter.

5. Communication terminal according to claim 3 characterized in that the band reject filter is an ARMA type of comb filter.

6. Interference suppressing arrangement for suppressing an interfering signal present in a desired signal, said interfering suppression arrangement comprising:

frequency separating means for separating its input signal into a plurality of sub-band signals;

amplitude adjusting means for adjusting at least an amplitude of the sub-band signals comprising spectral components of the interference signal; and combining means for combining the sub-band signals into a combined output signal, wherein the amplitude adjusting means are arranged for multiplying the amplitude of the sub-band signals comprising spectral components of the interference signal with a value which decreases with increasing strength of the spectral components of the interference signal.

7. Method for suppressing an interfering signal present in a desired signal comprising:

separating said desired signal into a plurality of sub-band signals comprising spectral components of the interference signal;

adjusting an amplitude of the sub-band signals; and combining the sub-band signals into a combined output signal;

wherein the adjusting act includes multiplying an amplitude of the sub-band signals comprising spectral components of the interference signal with a value which decreases with increasing strength of the spectral components of the interference signal.

8. Communication terminal comprising:

a transmitter for transmitting bursts of a modulated carrier; and an interference suppressor which suppresses an interference signal caused by the transmission of the bursts;

said interference suppressor comprising:

a frequency separator which separates an input signal into a plurality of sub-band signals;

an amplitude adjustor which adjusts an amplitude of the sub-band signals; and a combiner which combines the sub-band signals to form a combined output signal;

wherein the amplitude adjustor includes a multiplier which multiplies the amplitude of the sub-band signals with a value which decreases with increasing strength of the interference signal.

* * * * *